United States Patent

[11] 3,627,973

| | | |
|---|---|---|
| [72] | Inventor | Edward E. Smith<br>Upper St. Clair Township, Allegheny County, Pa. |
| [21] | Appl. No. | 49,358 |
| [22] | Filed | June 24, 1970 |
| [45] | Patented | Dec. 14, 1971 |
| [73] | Assignee | Teledyne, Inc.<br>Los Angeles, Calif. |

[54] SUCCESSIVE AUTOMATIC DEPOSITION OF CONTIGUOUS WELD BEADS UPON NONPLANAR SURFACES
13 Claims, 10 Drawing Figs.

[52] U.S. Cl. .................................................. 219/125 R, 219/76
[51] Int. Cl. .................................................. B23k 9/12
[50] Field of Search ........................................ 219/125, 76, 73, 137

[56] References Cited
UNITED STATES PATENTS

| | | | |
|---|---|---|---|
| 3,483,353 | 12/1969 | Braucht .................... | 219/76 X |
| 3,254,192 | 5/1966 | Braucht .................... | 219/76 |
| 2,839,663 | 6/1958 | McCollum ................. | 219/76 |
| 2,902,558 | 9/1959 | Zouck et al. .............. | 219/76 |
| 3,010,010 | 11/1961 | Jackson et al. ........... | 219/76 |

OTHER REFERENCES
McKay Product Bulletin, P-DRG921 on McKay Dredge-O-Matic

Primary Examiner—R. F. Staubly
Assistant Examiner—L. A. Schutzman
Attorney—Edward Hoopes, III ABSTRACT: Method and apparatus for automatic control of welding means throughout the continuous application of a plurality of generally horizontal contiguous weld beads upon a nonplanar surface. The surface may be irregularly curved in the direction traversed generally horizontally by the welding means, as the worn inner surface of a dredge pump housing. The welding means may be supported and moved generally horizontally along the surface in successive welding passes between predetermined points. Provision is made for automatic reversal of the direction of welding when the welding means complete a weld pass at either of the predetermined points. At each weld direction reversal point the welding means are automatically repositioned with respect to the surface to a new effective welding position by motorized shifting of the welding means in predetermined direction and extent at least one of horizontally, vertically and angularly. Such motorized shifting is programmed to produce welding conformance of the welding means to the surface during the deposition of the plurality of generally horizontal contiguous weld beads without welding operator attention.

INVENTOR.
EDWARD E. SMITH

BY Edward Hooper III
HIS ATTORNEY

PATENTED DEC 14 1971

INVENTOR.
EDWARD E. SMITH
BY
Edward Hooper III
HIS ATTORNEY

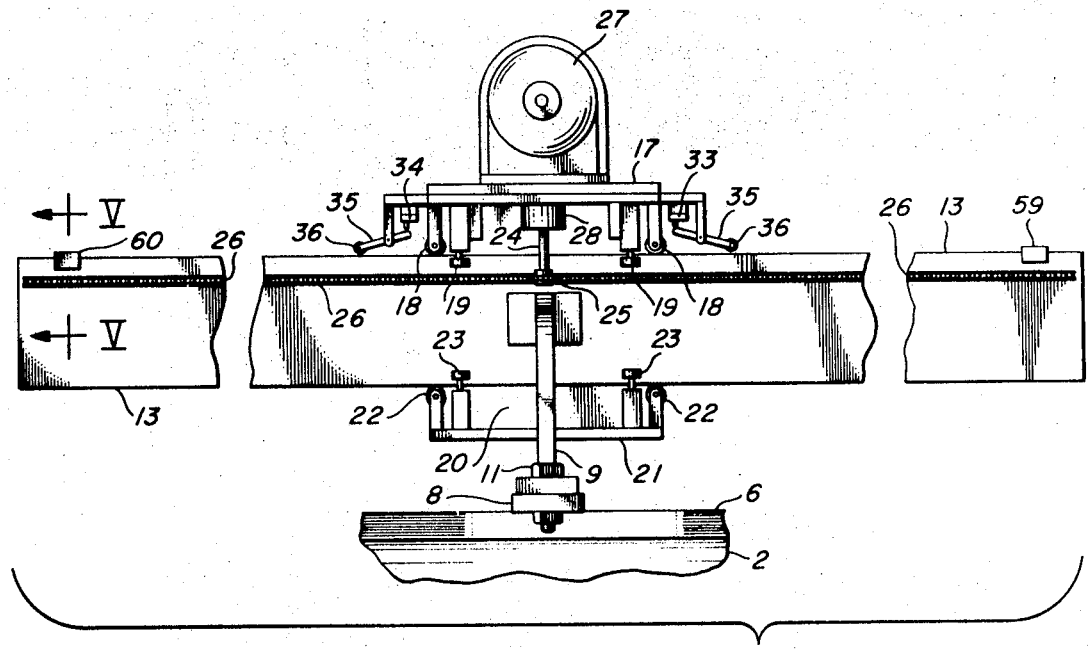
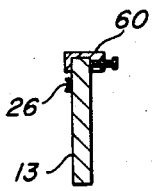
FIG. 4
FIG. 5
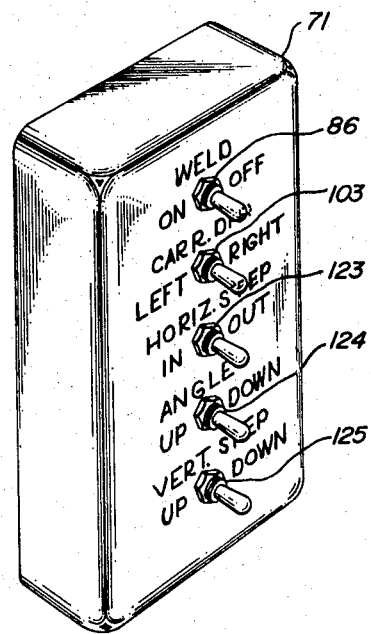
FIG. 6
INVENTOR.
EDWARD E. SMITH
BY
Edward Hooper III
HIS ATTORNEY

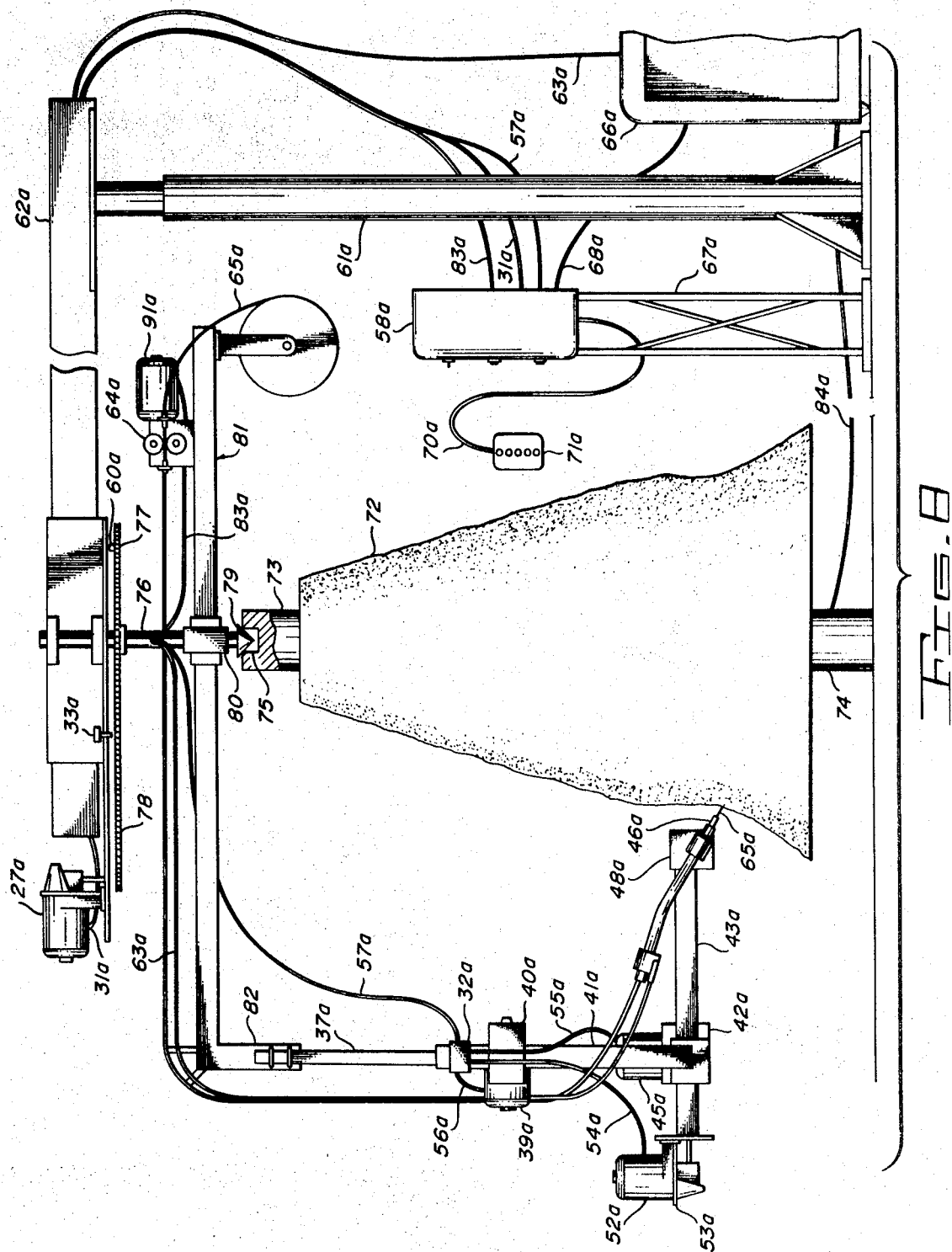

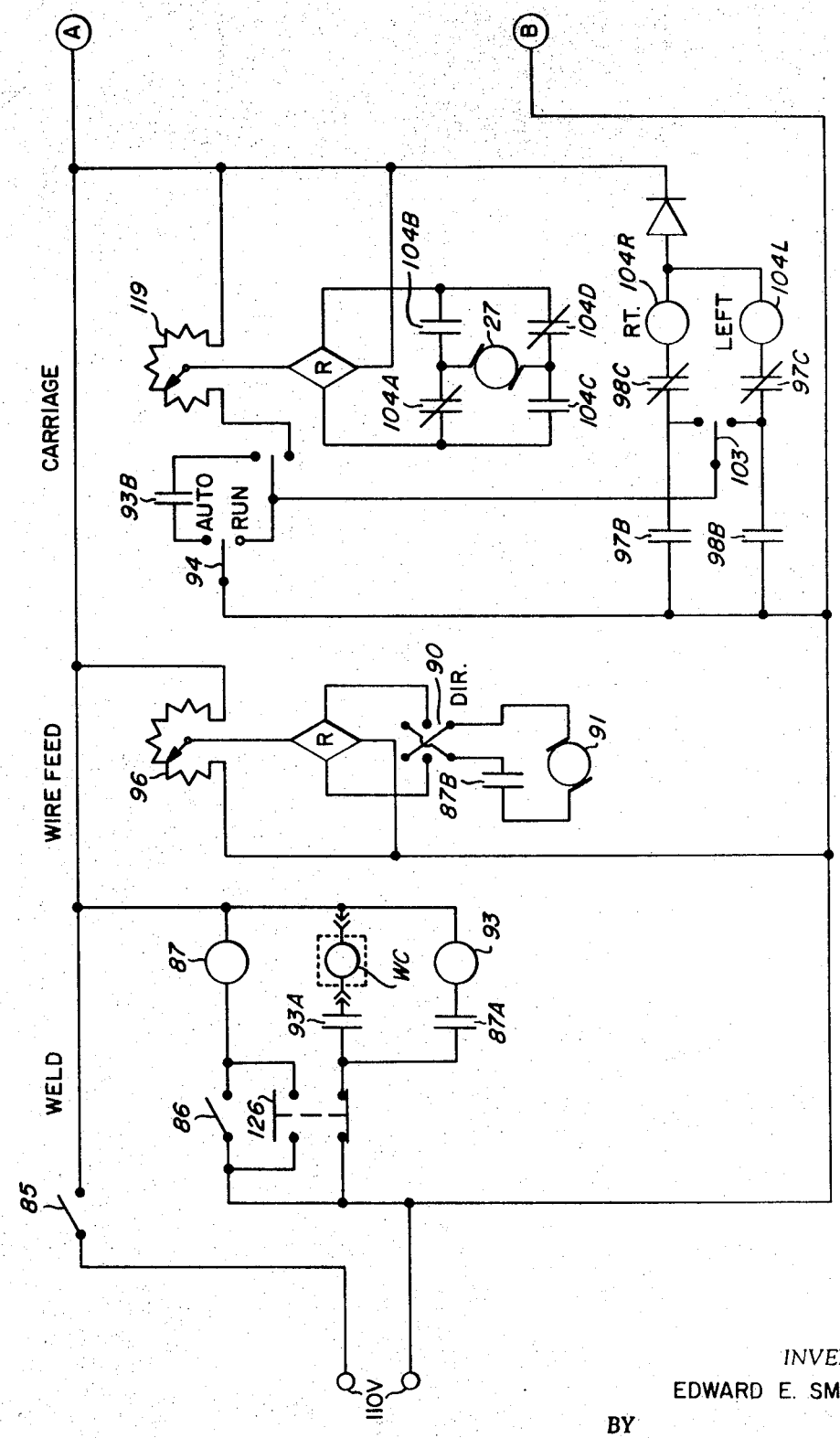

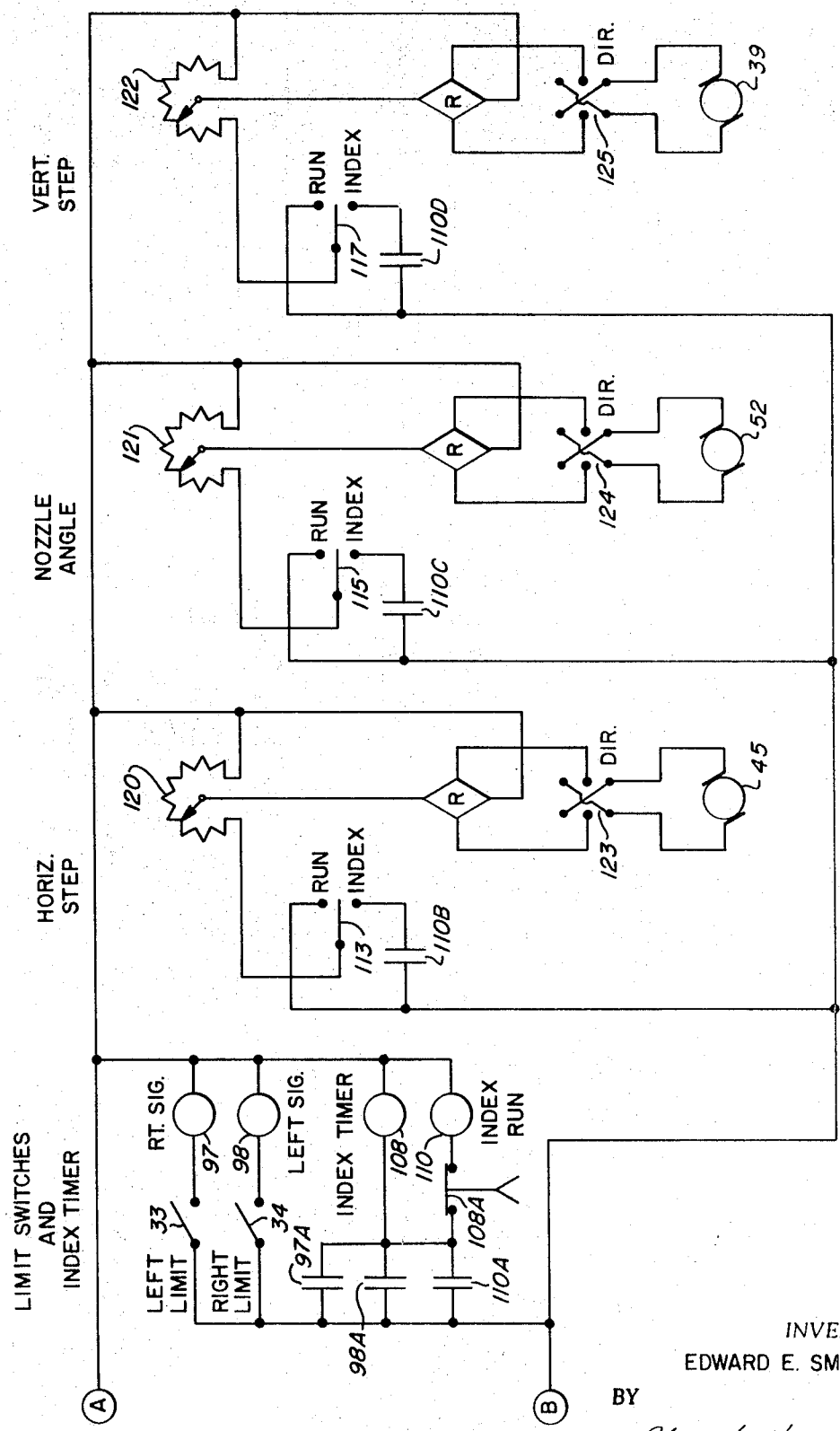

SUCCESSIVE AUTOMATIC DEPOSITION OF CONTIGUOUS WELD BEADS UPON NONPLANAR SURFACES

This invention relates to the successive automatic deposition of contiguous weld beads upon nonplanar surfaces. Examples of such surfaces are the worn inner surface of a dredge pump housing and the worn outer surface of a generally conical crusher mantle.

It is possible to guide welding means throughout the application of one bead by means such, for example, as a flexible guideway mounted generally parallel to a portion of the surface to which the weld metal is being applied. During application of that one bead guidance of the welding means by the operator may not be required as the guideway or other guiding means adequately performs the guiding function. However, upon completion of one bead the welding means must be moved spatially to a new position to apply the succeeding bead in contiguous relationship to the first bead. The path of the welding means in application of the second bead must differ from the path of the welding means in application of the first bead because the surface element to which the second bead is to be applied lies at a different height or distance or at a different slope from the surface element to which the first bead was applied.

Heretofore it has been necessary for the operator to cause the welding means to move to position to apply each succeeding bead in contiguous relationship to the preceding bead, which includes control of the horizontal and vertical position and the vertical angularity of the welding means in the different path which such means must follow in applying said succeeding bead.

I provide for automatic control of the welding means throughout the continuous application of a plurality of generally horizontal contiguous weld beads upon a nonplanar surface. The surface may be irregularly curved in the direction traversed generally horizontally by the welding means, as the worn inner surface of a dredge pump housing. In the direction transversely of the direction of welding the surface may lie at more than one slope, which matured as U.S. Pat. No. 3,569,658, granted Mar. 9, 1971.

I support and move the welding means generally horizontally along the surface in successive welding passes between predetermined points. I provide for automatic reversal of the direction of welding when the welding means complete a weld pass at either of the predetermined points. At each weld direction reversal point I automatically reposition the welding means with respect to the surface to a new effective welding position by motorized shifting of the welding means in predetermined direction and extent at least one of horizontally, vertically and angularly. I program such motorized shifting to produce welding conformance of the welding means to the surface during the deposition of said plurality of generally horizontal contiguous weld beads without welding operator attention. I select and effect a new program for motorized shifting of the welding means when necessitated by changing contour of the nonplanar surface for the attention-free deposition of the next plurality or series of contiguous weld beads.

While various welding systems, e.g., gas shielded or self-shielded, may be employed, I prefer to use a welding nozzle and feed continuous consumable welding electrode or wire through the nozzle and maintain a weld depositing arc between the end of the consumable welding electrode which protrudes from or sticks out of the nozzle and the nonplanar surface. Desirably the continuous consumable welding electrode or wire is self-shielded tubular continuous consumable welding electrode having broad tolerance for changes in stickout resulting from irregularities in the nonplanar surface which is characterized by wear which may be uneven.

In one aspect the present invention is in the nature of an improvement over the invention disclosed in copending application Ser. No. 719,879, filed Apr. 9, 1968. That application discloses apparatus for applying weld metal to the interior surface of a housing for a dredge pump or the like including manual adjustment means for changing the vertical, horizontal and angular positions of the welding gun. While the apparatus greatly reduced operator fatigue and increased efficiency by virtue of the fact that continuous concentration of the operator in adjusting the welding gun was not necessary, use of the apparatus still required the operator's presence at the welding station within the housing to manually readjust the position of the welding gun after each pass thereof around the interior of the housing or shell so that the weld bead deposited on the succeeding pass would be contiguous with the preceding bead.

I have improved the apparatus so as to obviate the need for the operator's presence inside the pump housing from the time one pass is begun until at least the next succeeding pass, and in many cases a substantial number of passes, is or are completed. In a preferred form of my apparatus I provide electric motors for incrementally changing the position of the nozzle in the vertical and horizontal directions and angularly about a horizontal axis, which motors may be programmed so that at the completion of one bead the nozzle will automatically reposition itself properly for the next succeeding bead; depending on the contour of the portion of the surface being rebuilt at any given time this sequence may continue for as many as five, six or even more passes. In some cases my improved method and apparatus can allow the weldor as much as 4 hours during which he need not be in attendance at the welding station and thus not only is free to do other jobs in the vicinity of the housing but also can greatly reduce his exposure to the heat and smoke from the welding operation.

Other details, objects and advantages of the invention will become apparent as the following description of certain present preferred embodiments thereof and certain present preferred methods of practicing the same proceeds.

In the accompanying drawings I have shown certain present preferred embodiments of the invention and have illustrated certain present preferred methods of practicing the same in which:

FIG. 4 is a fragmentary elevational view to reduced scale of a portion of the apparatus shown at the upper part of FIG. 3 as viewed from the left-hand side of FIG. 3;

FIG. 5 is a fragmentary vertical cross-sectional view taken on the line V—V of FIG. 4;

FIG. 6 is an isometric view of the remote control panel for the apparatus;

FIG. 8 is a general elevational view, largely diagrammatic, with portions cut away, of another form of my apparatus designed for the application of weld metal to the worn outer surface of a generally conical crusher mantle; and FIGS. 9a and 9b taken together constitute a wiring diagram illustrating one electrical wiring system which may be employed for the apparatus of FIGS. 1–7.

Figure 2:
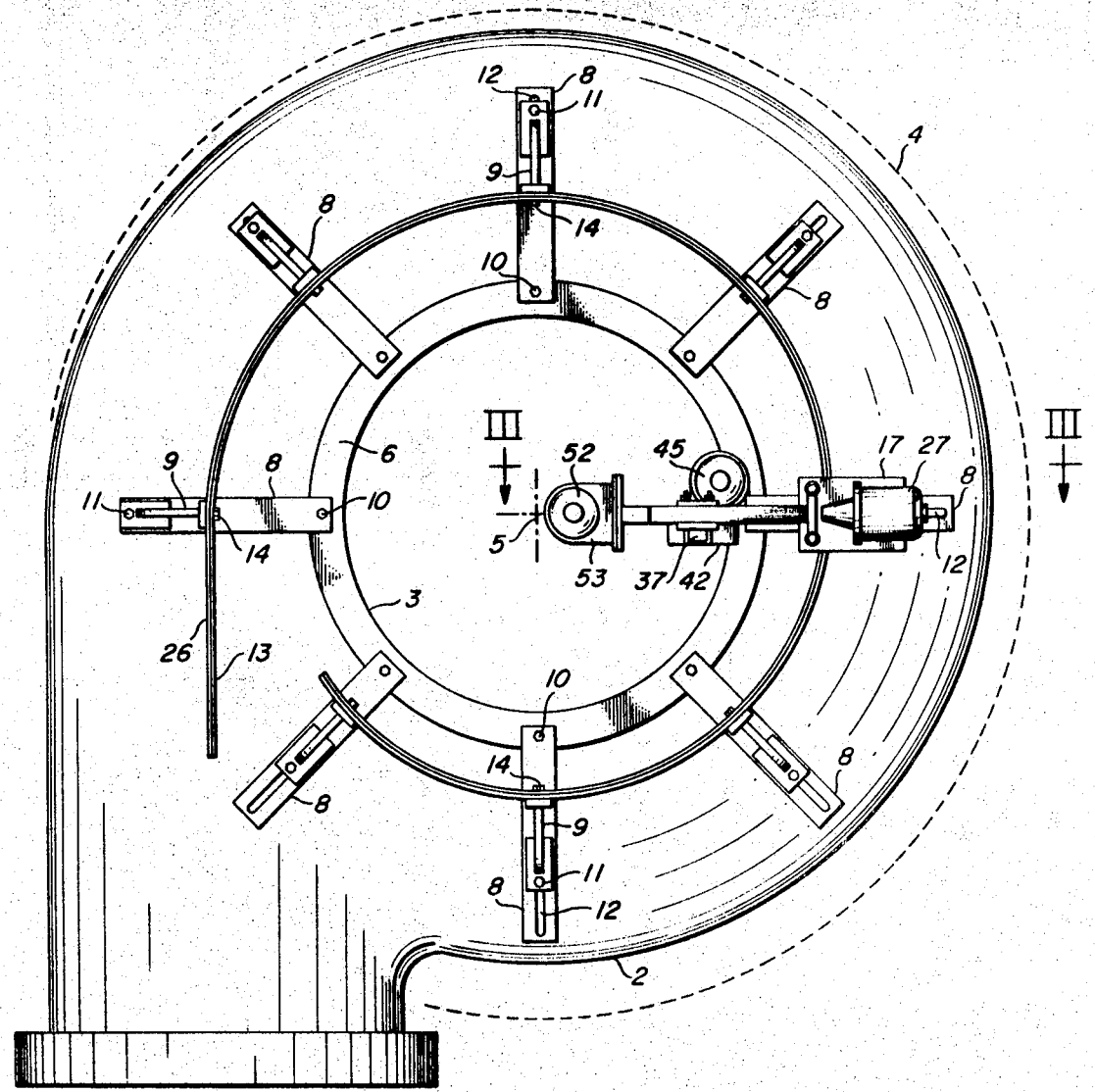
FIG. 2 is a plan view of the dredge pump housing and a portion of the apparatus taken as indicated by the line II—II of FIG. 1 but with parts, including wiring, omitted for clarity of illustration of the parts shown.

Referring now more particularly to the drawings, there is shown a dredge pump housing designated generally by reference numeral 2. The housing is shown as disposed on its side ready for application of weld material to its interior surface. Its upper side opening is shown at 3 and is circular, but the housing itself is noncircular, being more in the nature of a volute or the shape of a snail shell. To illustrate the noncircular shape of the housing there is shown in FIG. 2 in broken lines a circle 4 drawn about the axis 5 of the housing, which axis is also the center of the circular opening 3. Thus FIG. 2 illustrates that the inner surface of the housing to which the weld metal is to be applied is disposed a constantly changing distance from the axis of the housing as the means for applying weld metal advance along such surface.

A circular flange or rim 6 defines the opening 3. Spaced apart internally threaded bores 7 are provided in the flange 6 for attachment of a side plate carrying the pump rotor. The bores 7 are utilized for the attachment of adjustable brackets of which any number may be employed, a typical number being eight. Each of the adjustable brackets consists of a horizontal element 8 and an upright generally right-angle shaped element 9. In the form shown each element 8 is attached to the flange 6 by a bolt 10 threaded into one of the bores 7. Alternatively the elements 8 may be attached to a ring bolted to the flange 6. Each element 9 is adjustably positionable along the corresponding element 8 and fastenable in desired adjusted positions therealong by a bolt 11 passing through a longitudinal slot 12 in the element 8.

A flexible guideway designated generally by reference numeral 13 is provided for supporting and guiding the welding means. The brackets are adjusted so that the guideway 13 extends generally parallel to the inner surface of the housing 2. In practice the guideway is mounted parallel to the outer surface of the housing since the aim is to rebuild the worn inner surface to its as-new contour, which was parallel to the outer surface. The guideway 13 is attached to the brackets by means of bolts 14 passing through spaced apart holes 15 in the guideway and into threaded bores 16 in the upper ends of elements 9.

Welding means comprising a carriage 17 are mounted on the guideway 13. The carriage has rollers 18 riding atop the guideway and rollers 19 engaging the upper portion of the guideway at opposite sides. The carriage has a downward extension 20 carrying at its lower end a foot or shelf 21 which in turn carries rollers 22 riding along the bottom face of the guideway and rollers 23 engaging the lower portion of the guideway at opposite sides. The rollers 18 riding atop the guideway support the weight of the carriage and the rollers 19, 22 and 23 restrain the carriage against vertical and transverse movement relatively to the guideway. Journaled in the carriage is a vertical shaft 24 carrying at its lower end a toothed drive roller 25 which meshes with a roller chain 26 stretched around the outer surface of the guideway at the upper portion thereof and attached thereto. The shaft 24 carrying the toothed drive roller 25 is driven by a reversible variable speed electric motor 27 through suitable reduction gearing and a clutch 28 engageable and disengageable by a lever 29 pivoted at 30 to the carriage. As the toothed drive roller 25 is driven by the motor 27 when the clutch 28 is engaged the carriage 17 is caused to move along the guideway. Such movement may be in either direction depending upon the direction in which the motor is driven. An electric cable 31 is connected between the motor 27 and a junction box 32 carried by the carriage. Also carried by the carriage are two limit switches 33 and 34, respectively, each operated through a lever 35 by a roller 36. Electric wires (not shown) extend from the limit switches to the junction box 32.

The carriage 17 has a vertical mounting member 37 carrying a block 40 at its lower end. A reversible variable speed electric motor 39 is mounted on the block 40. The motor 39 drives a pinion (not shown) which meshes with a rack 38 on a vertically moveable member 41 guided by the vertical mounting member 37. This movement may also be accomplished by a means of driving a threaded shaft or the movement of a chain. Driving of the pinion meshing with the rack 38 moves the member 41 up or down depending upon the direction of driving of the motor 39. An electric cable 56 from the motor 39 leads to the junction box 32.

Figure 1:
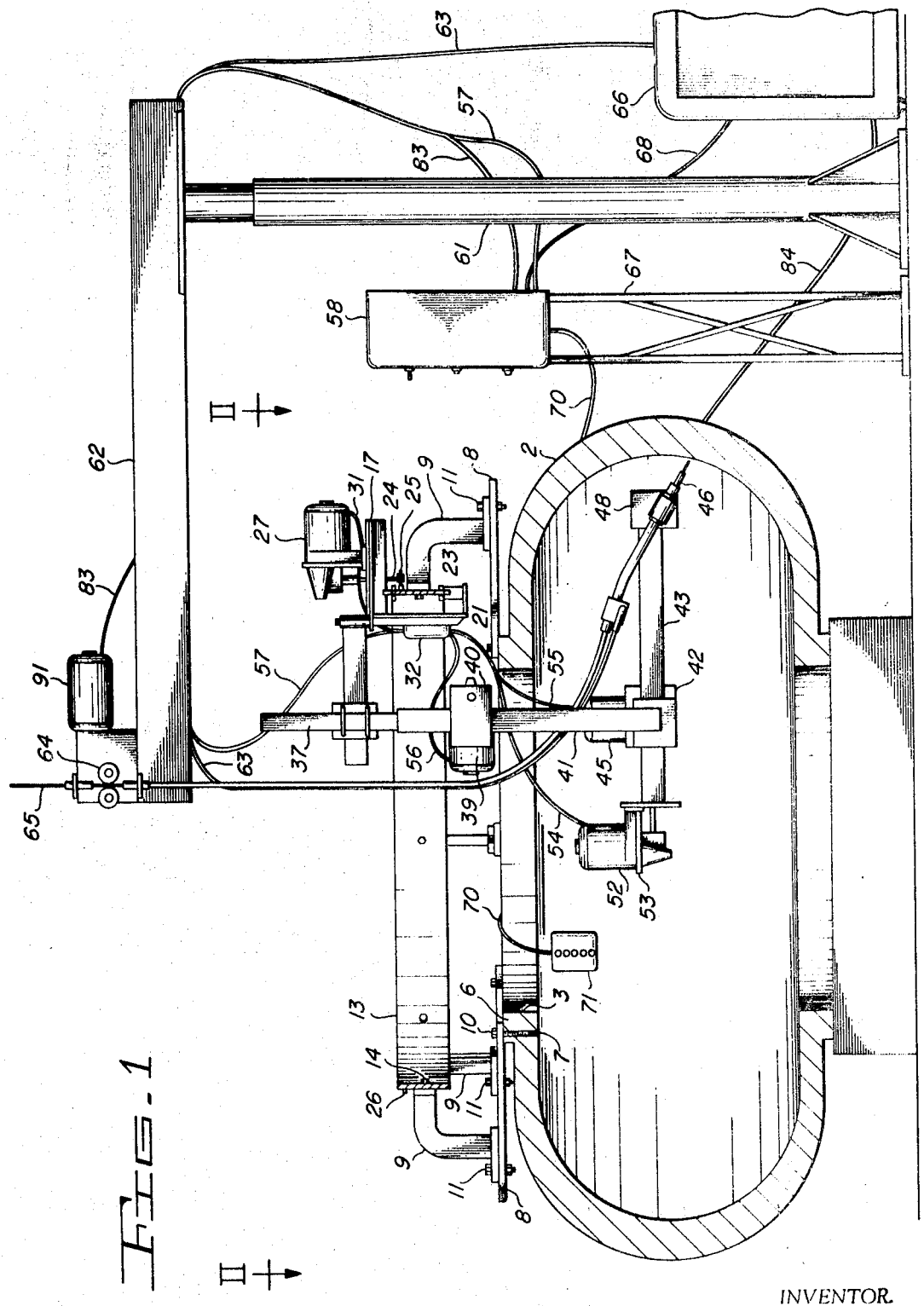
FIG. 1 is a general view of a form of my apparatus designed for the application of weld metal to the worn interior surface of a dredge pump housing, the apparatus being shown in elevation and the dredge pump housing being shown in vertical cross section.

At its lower end the member 41 carries a bracket 42 in which is mounted a horizontal member 43. The horizontal member 43 carries a rack 44 meshing with a pinion (not shown) adapted to be driven through suitable reduction gearing by a reversible variable speed electric motor 45 mounted on the bracket 42. Driving of the pinion meshing with the rack 44 moves the horizontal member 43 to the right or to the left viewing FIGS. 1 and 3 depending upon the direction of driving of the motor 45. An electric cable 55 from the motor 45 leads to the junction box 32.

Figure 3:
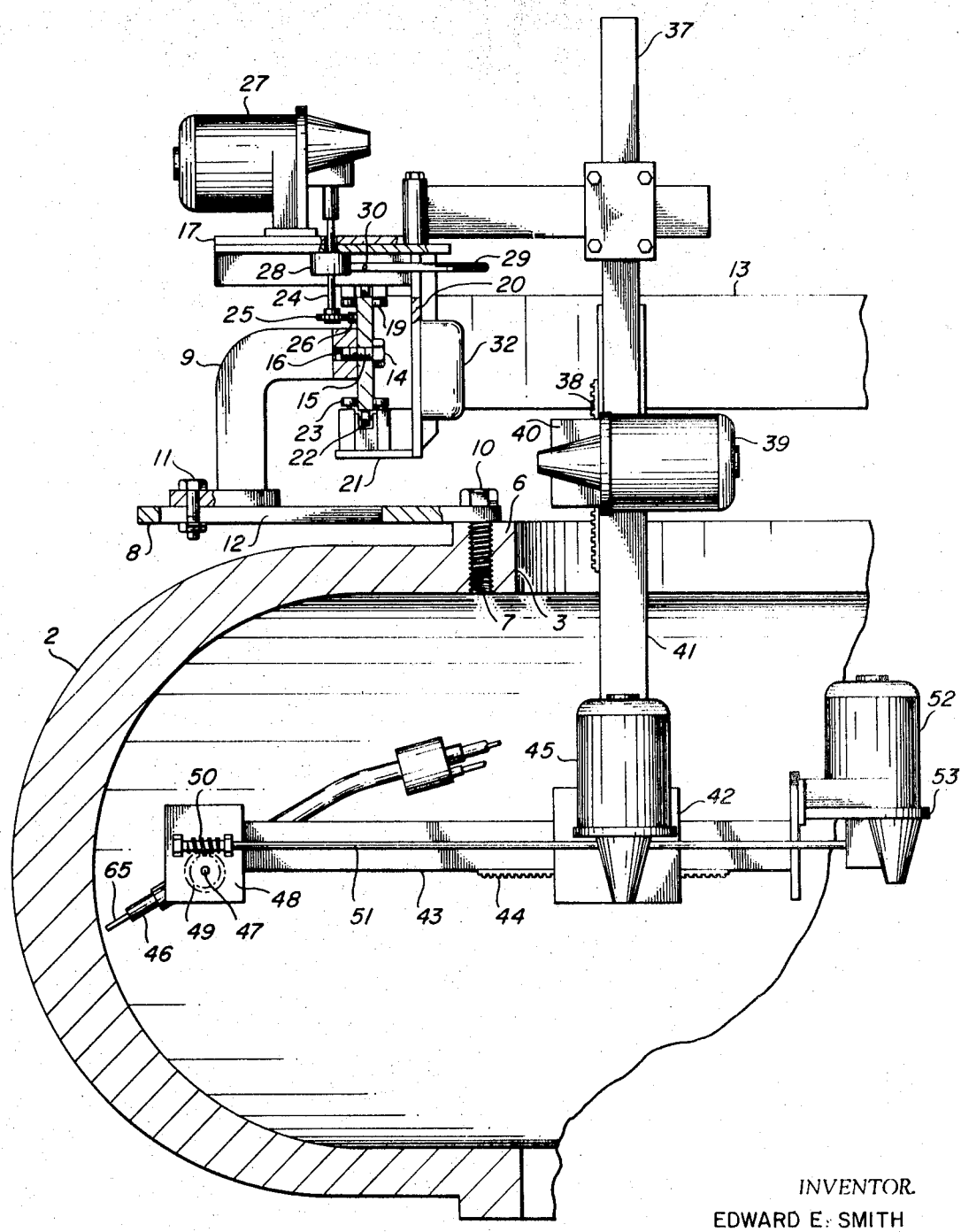
FIG. 3 is a fragmentary vertical cross-sectional view to enlarged scale taken on the line III—III of FIG. 2 but with parts, including wiring, omitted for clarity of illustration of the parts shown.

The welding nozzle is designated 46 and is connected with a shaft 47 journaled in a bracket 48 carried by the horizontal member 43 at the end thereof as shown in FIG. 3. Fixed to the shaft 47 is a worm wheel 49 meshing with a worm 50 fixed to a horizontal shaft 51 journaled in the horizontal member 43 and adapted to be driven through suitable reduction gearing by a reversible electric motor 52 mounted on a bracket 53 carried by the horizontal member 43 at the end thereof opposite the end at which the welding nozzle is disposed. Driving of the worm wheel 49 rotates the welding nozzle 46 about the axis of the shaft 47 in clockwise or counterclockwise direction viewing FIG. 3, depending upon the direction of driving of the motor 52. An electric cable 54 from the motor 52 leads to the junction box 32.

The junction box 32 serves to connect the electrical cables from motors 27, 39, 45 and 52 and limit switches 33 and 34 with a master cable 57 from the junction box to the main control panel 58. Mounted on the guideway 13 are two positionally adjustable stop members 59 and 60 which are mounted at the respective ends of the path over which the carriage 17 is to travel. The purpose of the stop members 59 and 60 is to coact with the limit switches 33 and 34, respectively, mounted on the carriage 17 as will be explained below.

Mounted beside the housing 2 is a vertical standard 61 having at the top thereof a horizontal arm 62 extending over the housing 2. The arm 62 serves as a conduit for master cable 57 leading to the junction box 32. In addition the arm 62 carries wire feed means 64 of a conventional type for feeding the electrode 65 to the welding nozzle 46; electrical cable 83, partially carried by the arm 62, connects the wire feed motor 91 with the main control panel. Electrical cable 63 from the welding means travels through the arm 62 and thence to the welding power source 66 which may be of a conventional type and is preferably a constant potential power source. To complete the welding circuit, ground cable 84 from the power source is connected to the shell at a convenient location thereon by conventional means, not shown.

The main control panel 58 is mounted on a supporting pedestal 67 and is connected with the power source 66 through one cable 68 and to the junction box 32 on the carriage 17 through a second cable 57 mentioned above. A third electric cable 70 connects the main control panel 58 to a remote control panel 71 shown in FIG. 1 as hanging over the lip of the housing although it may be disposed wherever desired within the limits of the length of the electric cable 70.

Figure 7:
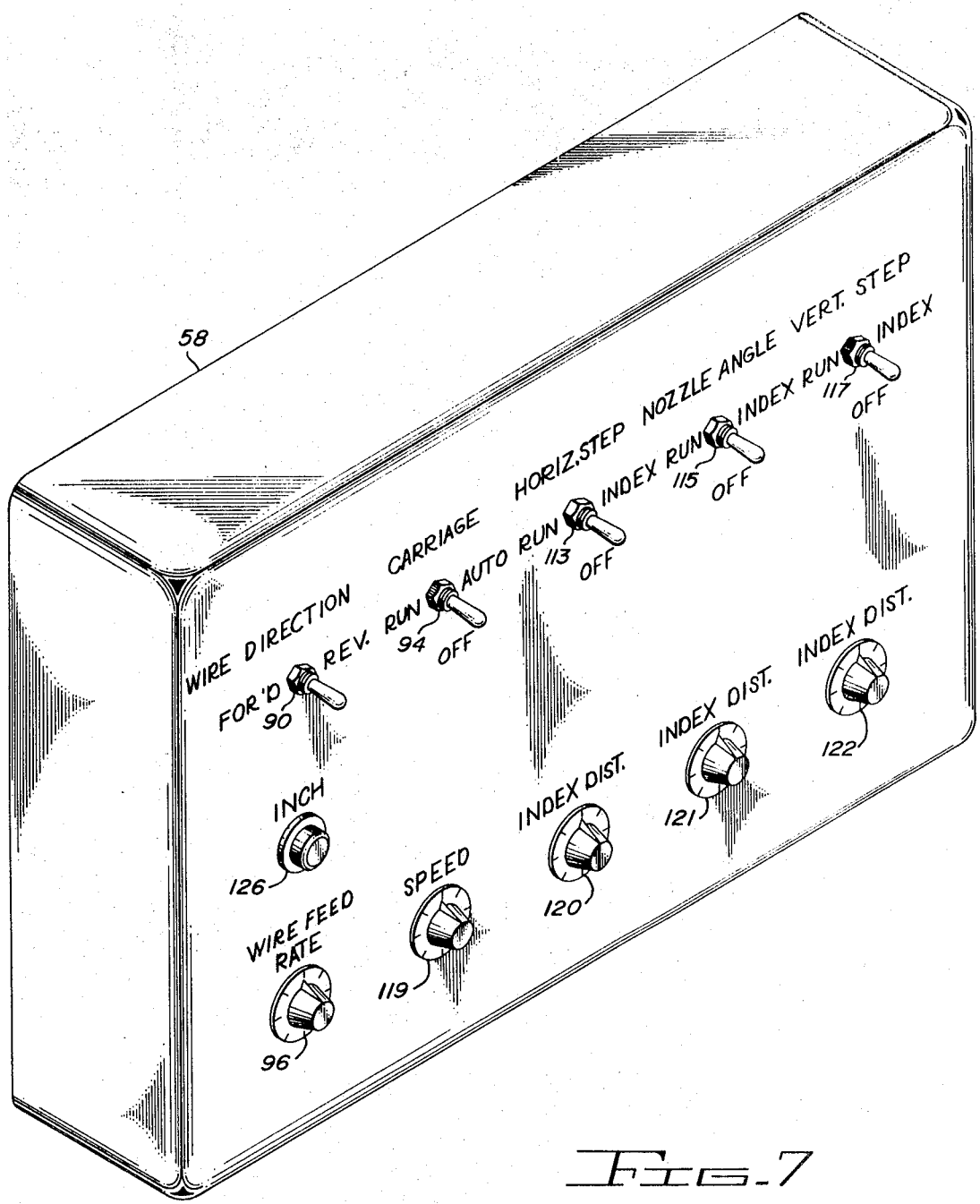
FIG. 7 is an isometric view of the main control panel for the apparatus.

Referring now to FIGS. 6 and 7, it will be seen that the main control panel 58 shown in FIG. 7 includes five groups of controls. Each of the five groups of controls includes a toggle switch at the upper portion and a rheostat control at the lower portion. Each of the five toggle switches has left, center and right positions, the center position being the off position. As the toggle switches are shown in FIG. 7 they are all in the off position. At the left in FIG. 7 are controls for the direction and speed of the welding electrode or wire which are connected to the wire-driving unit 64. The toggle switch 90 controls the direction of the wire, i.e., forward and reverse, and the rheostat 96 controls the rate of wire feed. In between the toggle switch and rheostat is a pushbutton switch 126 for inching the wire. Next to the right are controls for the carriage 17 which are connected with the motor 27. The toggle switch 94 provides for either continuous operation of the carriage motor in the absence of any welding ("RUN") or automatic operation thereof when welding so that the carriage moves when the arc is struck ("AUTO"). The rheostat 119 controls the speed of movement of the carriage. The "HORIZ. STEP" toggle switch 113 has "RUN" and "INDEX" positions and is connected with the motor 45 for controlling horizontal movement of the welding nozzle. Similarly the "NOZZLE ANGLE" toggle switch 115 is connected with the motor 52 and controls the angular movement of the welding nozzle. Similarly the "VERT. STEP" toggle switch 117 is connected with the motor 39 and controls the vertical movement of the welding nozzle. The three "INDEX DIST." rheostats 120, 121, 122 control the speeds of the respective motors. When each toggle switch is set at "INDEX" the index distance is increased by increasing the motor speed for predetermined constant running time of the corresponding motor and decreased by decreasing the motor speed for the predetermined constant running time of the corresponding motor.

The remote control panel 71 carries five toggle switches, the top one 86 being a master toggle switch which initiates or stops the entire welding operation, the second 103 determining carriage direction and the bottom three 123, 124, 125 controlling in and out horizontal movement of the welding nozzle, angular movement of the welding nozzle and vertical movement of the welding nozzle.

In use of the above-described apparatus for rebuilding the interior surface of a dredge pump housing the operator performs the following listed steps:

1. Mount the guideway 13 on the housing 2 so that the guideway is generally parallel to the surface to be rebuilt.
2. Mount the carriage 17 on the guideway 13 with the clutch 28 disengaged; the carriage is now in a free wheeling state.
3. Determine the limits of the path over which the carriage is to travel for depositing weld metal; at each end of this path attach one of the stop elements 59 and 60 to the guideway 13.
4. Position the carriage at the beginning of the path and engage the clutch.
5. Position the main control panel 58, welding power source 66 and standard 61 with the mechanism carried thereby and complete all electrical connections.
6. Turn on main power.
7. Set carriage speed; this is usually about 60 lineal inches per minute.
8. Set wire feed rate at approximately the speed necessary to provide the burn off rate and current desired and inch the wire forward until it extends from the nozzle tip so that the end of the welding wire or electrode 65 is in position to begin welding.
9. Study the curvature of the surface to be rebuilt and determine what combination of movements of the welding nozzle 46 is required for proper step over at the completion of each bead. This determination is best done through experience; generally the nozzle should index a distance of approximately one-fourth inch. On the essentially horizontal surface of the bottom of the dredge pump housing 2 horizontal step motion is generally all that is required. When rebuilding the curved side portions of the interior surface of the housing the operator may decide that either angular movement alone or a combination of angular, horizontal and/or vertical movements is necessary for proper positioning of the nozzle for welding, including maintaining the end of the welding nozzle 46 at approximately a constant distance from the surface.
10. Having determined the distance and type of motion required of the nozzle in indexing, program the nozzle movement by setting the appropriate toggle switches on the main control panel to "INDEX" or "OFF" and adjusting the appropriate "INDEX DIST." rheostats to provide the necessary total movement. As above indicated, the preferred apparatus uses a constant running time for indexing, the distance being adjusted by adjusting the speed of the indexing motors. Although constant speed motors and adjustable timing mechanisms could serve the same purpose, such combinations are considerably more expensive than constant time means and adjustable speed motors.
11. Turn the "CARRIAGE" toggle switch 94 on the main control panel to "AUTO".
12. Set the "CARR. DIR." toggle switch 103 on the remote control panel to "LEFT" or "RIGHT" depending on the direction in which the carriage 17 is to move along the guideway 13 in depositing the first bead.
13. Set the "HORIZ. STEP" toggle switch 123 in the remote control panel to "IN" or "OUT" depending on which way the nozzle is to index in the horizontal direction. If no horizontal index motion is used the position of the toggle switch on the remote control panel is unimportant as the "HORIZ. STEP" toggle switch 113 on the main control panel will be set at "OFF.[ The same applies to the "VERT. STEP" toggle switches 125, 117.
14. Set the "ANGLE" toggle switch 124 on the remote control panel to "UP" or "DOWN" depending upon the index motion desired. Again if no angular index motion is used the "NOZZLE ANGLE" toggle switch 115 on the main control panel will be set at "OFF" so the remote toggle switch position will be unimportant.
15. Set the "WELD" toggle switch 86 on the remote control panel to "ON" to initiate the arc and start motion of the carriage along the guideway.

On completion of step 15 the carriage moves along the guideway to deposit the first bead of weld metal. When the limit switch 33 or 34 mounted on the carriage 17 coacts with the stop member 59 or 60 as the case may be at the end of the path the carriage motor 27 reverses direction and the indexing motors adjust the nozzle position for the second bead. The running time of the indexing motors, which is predetermined, is very short so that indexing is normally completed in a fraction of a second. The second bead is then deposited in the reverse direction from the first and contiguously thereto. At the end of the second bead the second limit switch on the carriage coacts with the stop member at the beginning of the path, causing a repeat of the indexing motions and another reversal in direction of the carriage drive motor in preparation for deposition of the third bead. This process continues until the curvature of the interior surface of the dredge pump housing dictates a change in the combination of index motions, at which time the operator stops welding and readjusts the indexing controls.

An attractive and important feature of the invention is that when the preferred self-shielded electrode is used with the apparatus the arc is "self-adjusting," i.e., is tolerant to small changes in nozzle-to-surface distance caused either by irregularities in the surface being rebuilt or, more importantly, by the fact that the programmed nozzle indexing may not always follow the precise curvature of the interior surface of the housing. This "self-adjusting" feature extends the time that the unit can run without operator attention on one group of nozzle index settings and thus increases the useful arc time per job.

Referring now to FIG. 8, which is a general elevational view, largely diagrammatic, with portions cut away, of a form of my apparatus designed for the application of weld metal to the worn outer surface of a generally conical crusher mantle, I have shown a worn generally conical crusher mantle designated by reference numeral 72 having axial trunnions 73 and 75 at its respective ends. The mantle 72 is mounted and maintained in vertical position by any suitable mounting means (not shown) and a centering cavity 75 in the upper trunnion 73 serves in centering the weld metal applying means to the mantle.

In describing the apparatus of FIG. 8 elements of that apparatus corresponding or generally corresponding to elements of the apparatus of FIGS. 1–7 are designated by the same respective reference numerals, each with the letter "a" appended thereto.

Mounted beside the mantle 72 is a vertical standard 61a having at the top thereof a horizontal arm 62a extending over the mantle 72. Journaled for rotation in the arm 62a is a hollow vertical shaft 76 to which is fixed a sprocket 77 adapted to be driven by a sprocket chain 78 by the motor 27a carried by the arm 62a. A stop member 60a is mounted on the sprocket 77 and a limit switch 33a is carried by the arm 62a in the path of the stop member 60a, the function of the stop member 60a and the limit switch 33a being to stop and reverse the direction of rotation of the sprocket 77 and hence of the shaft 76 after each rotation of the shaft. Actually the action of the stop member and limit switch is modified by the insertion of a variable time delay switch (not shown) in the circuit between the limit switch and the motor 27a whereby the shaft rotates slightly more than a full turn (about 362°) each time before its direction of rotation is reversed.

At its lower end the shaft 76 carries a conical-centering member 79 adapted to seat in the centering cavity 75 so that the shaft 76 and the mechanism carried thereby may be located in coaxial relationship to the mantle 72.

The shaft 76 carries a bracket 80 in which is mounted for horizontal adjustment a bar 81 having a downward extension 82 at one end as shown in FIG. 8. The extension 82 carries a vertical mounting member 37a vertically adjustable with respect thereto, and the vertical mounting member 37a carries the welding mechanism shown in FIG. 1 for applying weld metal to worn outer surfaces of the mantle 72. All other elements of FIG. 8 correspond to elements of FIGS. 1–7 and as above indicated are designated by the same respective reference numerals, each with the letter "a" appended thereto. The operation of the apparatus of FIG. 8 is analogous to that of the apparatus of FIGS. 1–7 except that the weld applying means instead of riding around on a track on the dredge pump housing are carried by the bar 81 rotating around the shaft 76 to apply successive beads of weld metal to the surface of the mantle 72.

FIGS. 9a and 9b, taken together and joined at the points A and B at the right-hand side of FIG. 9a and the left-hand side of FIG. 9b, constitute a somewhat simplified wiring diagram illustrating one of many forms of electrical wiring system which may be employed for the apparatus shown in FIGS. 1 through 7. The top and bottom lines of FIGS. 9a and 9b are conductors of an electrical circuit having a potential of 110 volts AC as indicated at the left of FIG. 9a. The simplified diagram includes functional groups of components labeled at the tops of the figures. All the motors are DC motors, current for which is rectified from the AC by rectifiers shown in the diagram as diamonds enclosing the letter R. Circles in the diagram represent relay coils which when energized close or open one or more sets of relay contacts. The relay contacts are shown by a pair of short parallel vertical lines when normally open and by such lines crossed by a short diagonal line when normally closed; each set of contacts carries the number of the coil by which it is activated followed by A, B, C or D. Not shown is the electrical circuit for the welding arc itself which is typically a conventional rectified DC circuit well known to those skilled in the art. The switch labeled "WC" in the "WELD" section of the figure is the weld contact switch which closes the arc circuit to produce an arc when the electrode tip strikes the workpiece.

The illustrated form of control circuit functions essentially as follows. If it is desired to run the carriage 17 to its starting position without welding, switch 94 on the main control panel 58 is set to "RUN" and switch 103 on the remote panel 71 is set to "LEFT" or "RIGHT" as desired, thus completing the circuit through the carriage motor 27 and causing the carriage to run until the switch 94 is set to "OFF." For the sake of example, assume that the carriage is run to the right end of the path over which weld metal is to be deposited, viewing the apparatus from inside the shell 2. When the carriage is in position switch 94 is reset to "AUTO," which directs current through contacts 93B to the "SPEED" rheostat 119, and "CARR. DIR." switch 103 on the remote control panel is set to "LEFT" so that at the start of welding motor 27 will move the carriage 17 to the left along the guideway 13 to deposit the first bead of weld metal.

To position the nozzle 46 for depositing the initial weld bead assume that the nozzle must be run toward the shell a certain distance in the horizontal direction, down a certain distance in the vertical direction and upwardly through a certain angle. These motions are normally accomplished sequentially as opposed to all at one time. For horizontal positioning, the "HORIZ. STEP" switch 123 on the remote control panel 71 would be set to "IN," which directs current so as to cause reversible motor 45 to rotate properly for inward motion of horizontal member 43, and "HORIZ. STEP" switch 113 on the main control panel 58 would be set to "RUN," which bypasses contacts 110B and sends current directly through "INDEX DIST." rheostat 120 thus completing the AC circuit and thereby sending DC through motor 45 to cause the desired horizontal motion. At the completion of the desired horizontal motion, switch 113 would be reset to "OFF" or "INDEX," as desired. As previously explained, "INDEX DIST." rheostat 120 determines the speed of motor 45 for both running and indexing. The circuits for both the nozzle angle motor 52 and the vertical step motor 39 are identical to that for the horizontal step motor 45 and adjusting initial nozzle position in the vertical and angular directions proceeds as described for the horizontal adjustment. For this example let it be assumed that the nozzle 46 must index horizontally, angularly and vertically at the completion of the first pass in order to be in proper position for the second contiguous bead. After initially positioning the nozzle in such a case switches 113, 115 and 117 would all be set to "INDEX," which directs current through relay contacts 110B, 110C and 110D, respectively, whenever the contacts are closed. The directions of motion in the horizontal, angular and vertical directions are selected by appropriately positioning switches 123, 124 and 125, respectively.

To inch-welding electrode 65 forward to welding position, "WIRE DIRECTION" switch 90 is set to "FOR'D" and the "WIRE FEED RATE" rheostat 96 is set at the desired wire feed speed. "INCH" button 126 is then depressed which energizes coil 87, causing contacts 87A and 87B to close. The closing of contacts 87A has no effect in inching since those contacts are taken out of the circuit when the button 126 is pushed; however, closing of contacts 87B completes the DC circuit to wire feed motor 91 and causes the motor to feed wire until the "INCH" button is released.

When preliminary positioning of the nozzle carriage and electrode is completed the operator is ready to begin depositing weld metal. The operation of the illustrated control circuit during the deposition of two continuous beads of weld metal will now be described.

To start welding the operator turns "WELD" switch 86 on the remote control panel 71 to "ON." This energizes coil 87 which closes contacts 87A and 87B. Closing of contacts 87A energizes coil 93 which closes contact 93A to complete the circuit through the weld contact switch and thus energize the electrode 65 for welding. Closing of contacts 87B completes the circuit through the wire feed motor 91 to start wire feeding into the arc. Energizing of coil 93 also closes contacts 93B to feed current to the carriage drive motor 27, which starts the carriage 17 moving along the guideway 13 to deposit weld metal on the interior surface of the shell 2. In this exemplary situation the carriage 17 initially travels to the left because "CARR. DIR." switch 103 on the remote control panel 71 was initially set at "LEFT," which sets contacts 104A, 104B, 104C and 104D to cause reversible motor 27 to move the carriage 17 to the left.

Deposition of weld metal continues until stop member 59 on guideway 13 closes the left limit switch 33 which energizes the "RT. SIG." coil 97 which in turn closes contacts 97A and 97B and opens contacts 97C. Contacts 97A and 97B automatically reopen and contacts 97C automatically reclose when left limit switch 33 is opened by movement of the carriage away from stop member 59. Closing of contacts 97B energizes coil 104R which closes contacts 104B and 104C and opens contacts 104A and 104D, thus reversing the direction of current flow through the carriage drive motor 27 and thereby reversing the direction of travel of the carriage 17. Closing of contacts 97A starts operation of the "INDEX TIMER" 108 and energizes the "INDEX RUN" coil 110; energizing the "INDEX RUN" coil 110 closes contacts 110A, 110B, 110C and 110D. Contacts 110A act as a lock because contacts 97A automatically reopen as mentioned above. Closing of contacts 110B, 110C and 110D causes the indexing motors 45, 52 and 39, respectively, to run. When the "INDEX TIMER" 108 reaches the end of its preset interval it temporarily opens switch 108A and this deenergizes coil 110 which allows contacts 110A, 110B, 110C and 110D to open and thereby stops the indexing motors. As previously indicated, indexing is normally completed in only a fraction of a second.

The nozzle has now been indexed for the second bead and the carriage direction has been reversed; as electrode 65 continues to advance into the arc through the nozzle 46 the second contiguous bead is deposited toward the right. Left limit switch 33 is opened when the carriage moves away from stop member 59, and this deenergizes coil 97 which reopens contacts 97A and 97B and recloses contacts 97C.

When the right end of the path is reached stop member 60 closes the right limit switch 34 which energizes "LEFT SIG." coil 98. Energizing of coil 98 closes contacts 98A and 98B and opens contacts 98C. Closing of contacts 98A starts the "INDEX TIMER" 108 again and energizes "INDEX RUN" coil 110 which closes contacts 110A, 110B, 110C and 110D to cause another indexing of the nozzle to position for depositing the third bead. Closing of contacts 98B energizes coil 104L which closes contacts 104A and 104D and opens contacts 104B and 104C thereby sending current through carriage drive motor 27 in the original direction and causing the carriage 17 to again move to the left. When the "INDEX TIMER" 108 has completed the preset interval of time it temporarily opens switch 108A which deenergizes the "INDEX RUN" coil 110 and thereby stops indexing motors 45, 52 and 39. Again, as the carriage 17 moves away from stop member 60 the right limit switch 34 opens to deenergize coil 98 and thereby reopen contacts 98A and 98B and reclose contacts 98C.

While I have shown and described certain present preferred embodiments of the invention and have illustrated certain present preferred methods of practicing the same, it is to be distinctly understood that the invention is not limited thereto but may be otherwise variously embodied and practiced within the scope of the following claims.

I claim:

1. In the successive automatic deposition of a plurality of generally horizontal contiguous weld beads upon a nonplanar surface by supporting and moving welding means generally horizontally along the surface in successive welding passes between predetermined points, the improvement consisting of automatically reversing the direction of welding when the welding means complete a weld pass at either of the predetermined points, and at each weld direction reversal point automatically repositioning the welding means with respect to the surface to a new effective welding position by motorized shifting of the welding means in predetermined direction and extent at least one of horizontally, vertically and angularly, and programming such motorized shifting to produce welding conformance of the welding means to the surface during the deposition of said plurality of generally horizontal contiguous weld beads without welding operator attention.

2. The improvement defined by claim 1 including selecting and effecting a new program for motorized shifting of the welding means when necessitated by changing contour of the nonplanar surface for the attention-free deposition of the next plurality of contiguous weld beads.

3. The improvement defined by claim 1 including employing a welding nozzle and feeding continuous consumable welding electrode through the nozzle and maintaining a weld depositing arc between the end of the consumable welding electrode and the nonplanar surface.

4. The improvement defined by claim 3 including feeding through the nozzle self-shielded tubular continuous consumable welding electrode having broad tolerance for changes in stickout resulting from irregularities in the nonplanar surface.

5. In the application of weld metal to rebuild the interior surface of a housing for a dredge pump or the like, a method of reducing the amount of time required of the weldor within the interior cavity of the housing and thereby reducing his exposure to fumes, smoke and heat and improving efficiency of the operation, the method comprising providing welding means, maintaining the welding means in welding position with respect to the surface to which weld metal is being applied by means movably attached to a guideway extending substantially parallel to a portion of said surface, feeding continuous consumable electrode wire to the welding means from a source exterior to the housing, incrementally moving the welding means vertically, horizontally and/or angularly and programming the incremental movement of the welding means so that on successive passes over the surface being rebuilt the position of the welding means will be automatically adjusted to produce good overlap and tie-in of adjacent weld beads obviating the necessity of the weldor remaining within the interior cavity of the housing to make the necessary adjustments by hand.

6. Apparatus for the successive automatic deposition of a plurality of generally horizontal contiguous weld beads upon a nonplanar surface comprising means for supporting and moving welding means generally horizontally along the surface in successive welding passes between predetermined points including means for automatically reversing the direction of welding when the welding means complete a weld pass at either of the predetermined points together with means effective at each weld direction reversal point to automatically reposition the welding means with respect to the surface to a new effective welding position comprising motor means and means actuated by the motor means shifting the welding means in predetermined direction and extent at least one of horizontally, vertically and angularly, such shifting of the welding means being programmed to produce welding conformance of the welding means to the surface during the deposition of said plurality of generally horizontal contiguous weld beads.

7. Apparatus for the successive automatic deposition of a plurality of generally horizontal contiguous weld beads upon a nonplanar surface comprising a guideway extending in a generally horizontal direction substantially parallel to a portion of the surface, a carriage movable along the guideway, means for moving the carriage along the guideway from a first predetermined point on the guideway to a second predetermined point on the guideway, means for automatically reversing the direction of carriage movement when the carriage reaches each of said predetermined points, welding means carried by the carriage in position to apply a bead of weld metal to said surface as the carriage moves from one to the other of said predetermined points, means programmed to the shape of the surface for automatically repositioning the welding means in predetermined direction and extent at least one of horizontally, vertically and angularly when the carriage reaches each of said predetermined points, thereby insuring application of the second bead in contiguous relationship to the first bead when the carriage moves in the reverse direction between said predetermined points.

8. Apparatus for the successive automatic deposition of a plurality of generally horizontal contiguous weld beads upon a nonplanar surface as claimed in claim 7 in which the welding means comprise a welding nozzle, means feeding continuous consumable welding electrode through the nozzle and means maintaining a weld-depositing arc between the end of the consumable welding electrode and the nonplanar surface.

9. Mechanism for applying contiguous horizontal beads of weld metal progressively along a surface which is irregularly curved in the vertical direction comprising a guideway extending in a horizontal direction generally parallel to the surface, a carriage movable along the guideway, welding means for applying weld metal to the surface, connections between the welding means and carriage whereby the welding means are carried by the carriage for adjustable positioning horizontally, vertically and angularly, adjusting means for effecting such positioning of the welding means and control means programmed to the curvature of the surface in the vertical direction controlling the adjusting means to reposition the welding means at the completion of one bead in proper relationship to the surface for applying the next contiguous bead thereto when the carriage again moves along the guideway.

10. Mechanism for applying contiguous horizontal beads of weld metal progressively along a surface which is irregularly curved in the vertical direction as claimed in claim 9 in which the adjusting means include reversible motor means whose period and direction of operation are controlled by the control means.

11. Mechanism for applying contiguous horizontal beads of weld metal progressively along a surface which is irregularly curved in the vertical direction as claimed in claim 9 in which limit means are provided at each end of the surface together with means operated thereby for reversing the direction of movement of the carriage.

12. Apparatus for the successive automatic deposition of a plurality of generally horizontal contiguous weld beads upon a nonplanar surface generated by revolving a line about a vertical axis of rotation comprising a horizontal rotating arm supported at and pivoted about a point lying on said axis of rotation, means for rotating the arm about the axis of rotation from a predetermined starting point, welding means carried by the arm in position to apply a first bead of weld metal to the surface as the arm rotates about the axis of rotation and means programmed to the shape of the surface for automatically repositioning the welding means in predetermined direction and extent at least one of horizontally, vertically and angularly when the welding means has completed travelling through a predetermined arc, thereby insuring application of a second bead in contiguous relationship to the first bead.

13. Apparatus as claimed in claim 12 including means for automatically reversing the direction of rotation of the arm when the arm has travelled through an arc slightly greater than 360°, whereby to deposit the second bead in reverse direction to the first bead.

* * * * *

UNITED STATES PATENT OFFICE
CERTIFICATE OF CORRECTION

Patent No. 3,627,973    Dated December 14, 1971

Inventor(s) EDWARD E. SMITH

It is certified that error appears in the above-identified patent and that said Letters Patent are hereby corrected as shown below:

In the list of references cited, correct the number of the Zouck et al patent to read --2,902,588--.

Column 1, lines 41 and 42, cancel ", which matured as U. S. Pat. No. 3,569,658, granted Mar. 9, 1971"; line 73, before the period insert --, which matured as U. S. Pat. No. 3,569,658, granted Mar. 9, 1971--.

Column 4, line 49, at the end of the line after "third" delete the hyphen.

Column 6, line 9, change the bracket to a quotation mark.

Column 8, line 30, change "inch-welding" to --inch welding--.

Signed and sealed this 9th day of May 1972.

(SEAL)
Attest:

EDWARD M. FLETCHER, JR.
Attesting Officer

ROBERT GOTTSCHALK
Commissioner of Patents